United States Patent [19]

Hopkins et al.

[11] Patent Number: 4,654,737
[45] Date of Patent: Mar. 31, 1987

[54] MAGNETIC DISK MEMORY HEAD CARRIAGE ASSEMBLY EMPLOYING BACKLASH-FREE RACK AND PINION DRIVE MECHANISM

[75] Inventors: Donn A. Hopkins; Raymond W. Niles, Jr., both of Simi Valley, Calif.

[73] Assignee: Tandon Corporation, Chatsworth, Calif.

[21] Appl. No.: 593,140

[22] Filed: Mar. 26, 1984

[51] Int. Cl.$^4$ .................. G11B 5/55; G11B 21/08
[52] U.S. Cl. ........................... 360/106; 360/78
[58] Field of Search ............. 360/106, 105, 78, 97–99, 360/86, 75, 71–72.2; 74/89.11, 109, 29–30

[56] References Cited

U.S. PATENT DOCUMENTS

| | | | |
|---|---|---|---|
| 3,614,579 | 10/1971 | Fulton | 360/106 |
| 3,731,061 | 5/1973 | Laybourn | 235/61.11 D |
| 3,777,581 | 12/1973 | Sartori | 74/110 |
| 3,871,532 | 3/1975 | Dorosz et al. | 214/1 BB |
| 3,954,272 | 5/1976 | Leedom | 274/23 A |
| 4,143,409 | 3/1979 | Iwabuchi et al. | 360/106 |
| 4,187,736 | 2/1980 | Haegele | 74/422 |
| 4,306,244 | 12/1981 | Dold | 346/139 R |
| 4,400,750 | 8/1983 | Krane | 360/105 |
| 4,428,012 | 1/1984 | Applequist et al. | 360/106 |
| 4,464,689 | 8/1984 | Propst | 360/78 |

OTHER PUBLICATIONS

G. W. Michalec, "Precision Gearing," *Machine Design*, Feb. 1955, pp. 200–209; See FIG. 22 on p. 206.
F. T. Gutmann, "18 Ways to Control Backlash in Gearing," *Product Engineering*, Oct. 26, 1959, pp. 71–75; See FIG. 1, p. 72 and FIG. 6, p. 73.

Primary Examiner—Stuart N. Hecker
Assistant Examiner—David J. Severin
Attorney, Agent, or Firm—Bogucki, Scherlacher, Mok & Roth

[57] ABSTRACT

A carriage supporting at least one read/write head is displaceable by a rack and pinion drive toward and away from the axis of rotation of a magnetic disk. The carriage has a pair of rollers—one at the inner end of the carriage, the other at the outer end—in contact with a fixed precision guide. The rack is cantilevered from a flexure element projecting from the carriage and formed as an integral part of the carriage. The free end of the rack is resiliently biased so as to urge (i) the rack into firm, meshing engagement with the pinion and (ii) the carriage rollers into positive, preloaded engagement with the guide. The limits of carriage motion and spacing between rollers are such that the line of force between the rack and pinion is always intermediate the axes of the rollers so that the carriage is stable along the entire extent of its travel.

The rack is secured to the flexure element with a single screw fastener whose axis is oriented perpendicular to the pinion axis. Rapid and accurate prealignment of the rack and pinion teeth is thereby made possible.

A head loading arm, pivotally mounted on the carriage, is biased by a torsion spring toward the carriage. The force applied to the arm by the torsion spring is adjustable so that the head loading force can be precisely predetermined.

11 Claims, 6 Drawing Figures

MAGNETIC DISK MEMORY HEAD CARRIAGE ASSEMBLY EMPLOYING BACKLASH-FREE RACK AND PINION DRIVE MECHANISM

FIELD OF THE INVENTION

The present invention relates generally to magnetic disk memories and more particularly to an improved mechanism for precisely positioning the read/write heads relative to the surfaces of the disk.

BACKGROUND OF THE INVENTION

In magnetic disk memories, the read/write heads which transfer data to and from the disk surfaces are typically moved linearly by a positioning mechanism to access concentric data tracks on the disk surfaces in response to address signals applied to the mechanism.

Low cost mechanism positioning mechanisms employing flexible bands, lead screws, and rack and pinion elements have been extensively used. Each of these existing actuators has its advantages and disadvantages; all exhibit drawbacks as the requirements of positioning precision become more stringent with the increasing demands for higher capacities, and hence greater track densities, at the lowest possible cost. In particular, there is presently a need to achieve the small, precise, incremental track-to-track motion characterizing Winchester technology while preserving the low costs and compactness normally associated with floppy disk drives.

Flexible band drives, besides lacking the requisite degree of linearity and insensitivity to temperature variations, quickly reach an inherent track density limitation because the radius of the capstan cannot be reduced below the minimum radius of curvature of the band. Lead screw drives, because of the difficulty of forming threads having a helix angle that is constant along the entire length of the screw, often lack linearity between the extremes of travel of the follower element although the total displacement thereof can be accurately controlled. Rack and pinion drives, on the other hand, are easier and less costly to manufacture and provide a high degree of linearity but may introduce errors in overall displacement as a result of manufacturing tolerances in the pitch diameter of the pinion. Although adequate compensation schemes exist for these overall displacement errors, existing rack and pinion drives nevertheless tend to introduce motion errors due to play, component part dimensional variations and misalignment of the pinion and rack teeth.

SUMMARY OF THE INVENTION

In accordance with the present invention, there is provided a head positioning mechanism utilizing a rack and pinion drive that minimizes play and the effects of variations in component part dimensions and virtually eliminates rack and pinion misalignment. Precise and repeatable positioning of the heads relative to the data tracks is thereby achieved.

In a preferred, specific example of the invention, a head carriage includes a flexure element supporting the rack in cantilever fashion. The free end of the cantilevered rack is spring-biased so that the rack is urged toward the pinion while the carriage is urged into positive engagement with a precision guide rod along which the carriage travels. The flexure element is formed as an integral part of the carriage; this, in combination with the secure attachment of the rack to the flexure element provides a unitary structure eliminating all play between the rack and carriage in the direction of carriage travel. Thus, a given rotational displacement of the pinion results in a precisely corresponding increment of linear translation of the carriage.

In accordance with another aspect of the invention, the rack is attached to the flexure element by a single screw fastener oriented so that its axis is perpendicular to the rotational axis of the pinion. Momentary loosening of this fastener allows the teeth of the rack and pinion to automatically come into alignment under the urging of the rack bias spring.

The invention also provides a device for predetermining the head-to-disk loading force. In this connection, a load arm is pivotally mounted on the carriage by means of a flat spring thereby allowing the load arm to move toward and away from the carriage. A transverse shaft mounted on the carriage includes a detent mechanism and a compression spring urging the shaft toward a position in which it is locked against rotation. A torsion spring wrapped about the shaft has one end fixed to the shaft and another end coupled to the load arm. Shifting the shaft axially to a detent-disengaging position against the force of the compression spring unlocks the shaft permitting rotation thereof to vary the force applied to the load arm by the torsion spring to thereby predetermine the head loading force.

BRIEF DESCRIPTION OF THE DRAWINGS

Further features and advantages of the invention will become apparent from the detailed description which follows, when read in conjunction with the accompanying drawings in which.

DETAILED DESCRIPTION OF THE PREFERRED EMBODIMENT

Figure 1:
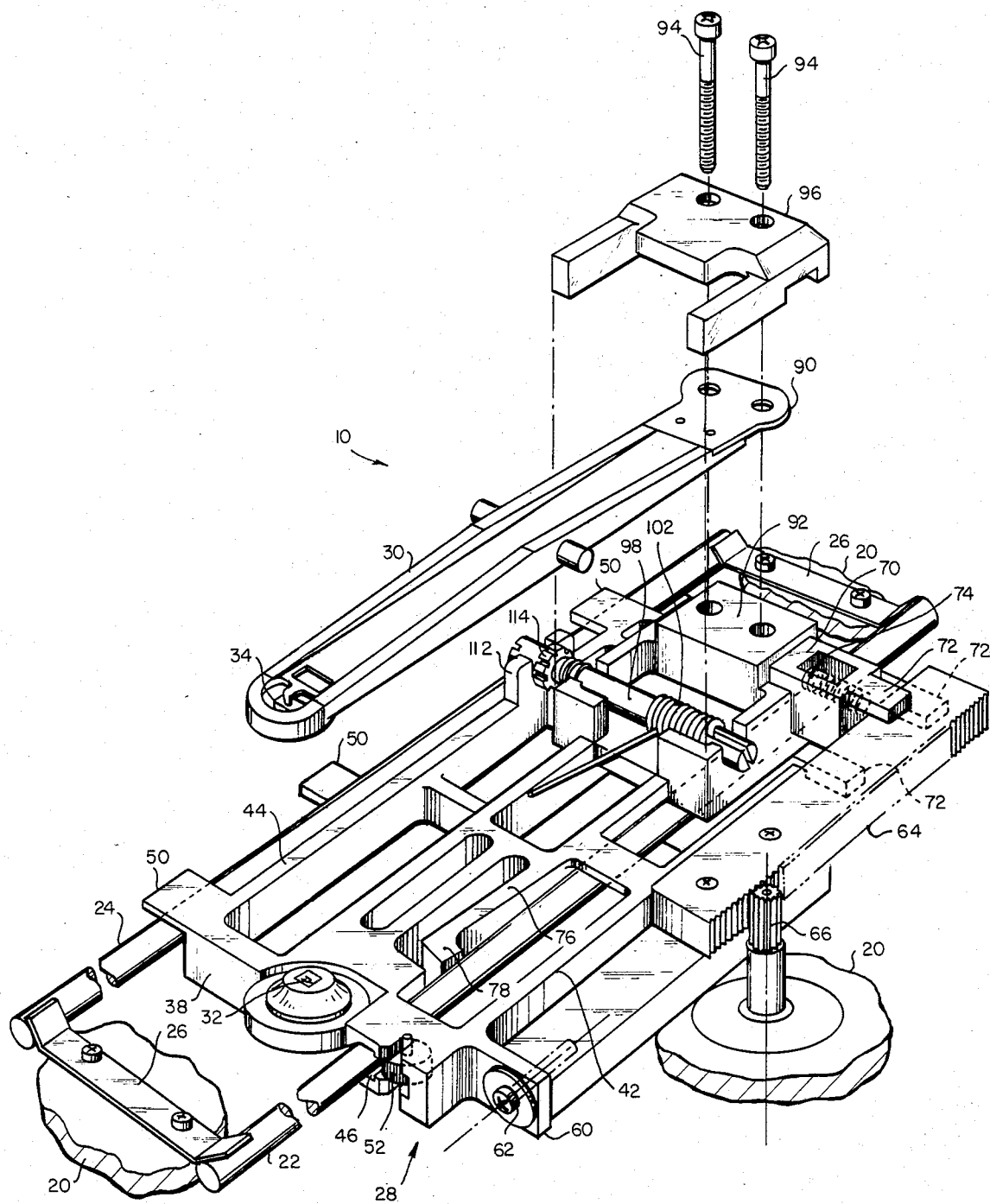
FIG. 1 is an exploded perspective view of a preferred embodiment of the head positioning mechanism of the present invention.

With reference to the drawings, there is shown a head positioning mechanism 10 designed for use in a floppy disk system which includes, generally, a flexible disk 12 mounted on a spindle 14 for rotation about an axis 16. The spindle is driven by a motor 18 mounted beneath a horizontal base plate 20.

The head positioning mechanism travels along a pair of fixed, parallel, precision guide rods 22 and 24 secured to the base plate by end clamps 26. The guide rod 22 is mounted in precise alignment with the desired linear path of travel of the positioning mechanism.

The mechanism includes a carriage 28 and an upper load arm 30 pivotally mounted on the carriage. A first read/write head 32, fixed relative to the nominal plane of the magnetic disk 12, is secured to one end of the carriage while a second read/write head 34, movable up and down with respect to the fixed head, is attached by a gimbal 36 to the free end of the arm 30. For convenience, the head 32 may also be referred to as the lower head and the head 34 as the upper head; both include transducers adapted to cooperate with the opposite surfaces of the disk in a manner well known in the art. In this connection, reference may be made to U.S. Pat. No. 4,151,573 issued Apr. 24, 1979, to Tandon et al. It will be appreciated, however, that while the specific embodiment under discussion relates to a double-sided floppy disk drive, the present invention is not limited to use in such drive or to any particular head construction or arrangement.

The carriage 28 is basically a flat, rectangular structure molded of glass fiber-filled polycarbonate, or the like, with cutaway or open portions to reduce its mass. The open portions are configured to define inner and outer cross members 38 and 40, respectively, and side rails 42 and 44. For purposes of this description, the terms "inner" and "outer" refer, respectively, to portions of the mechanism closer to or further from the rotational axis of the disk.

Figure 3:
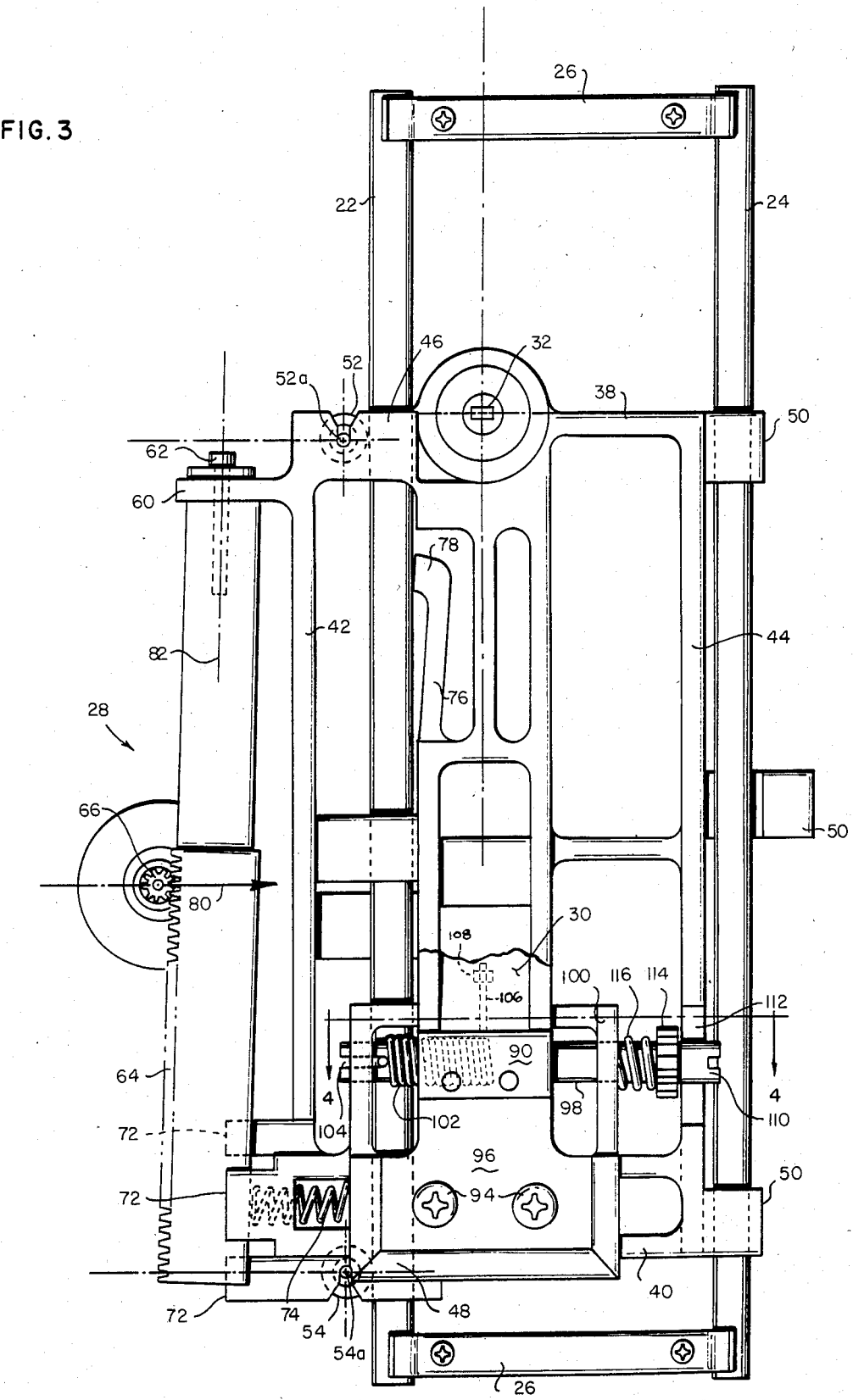
FIG. 3 is a plan view of the positioning mechanism.

The fixed head 32 is mounted in a receptacle formed in the carriage at the inner end thereof and as best seen in FIG. 3, is somewhat closer to the guide rod 22 than to the rod 24. The rod 22 extends through openings 46 and 48 in the cross members 38 and 40, while the rod 24 is engaged by three ears 50 projecting from the side rail 44, the ears 50 stabilizing the carriage. Inner and outer low friction rollers 52 and 54 mounted in cross members 38 and 40, respectively, bear against the guide rod 22 to constrain the carriage laterally so that it moves along a precise linear path. The geometry is such that the heads 32 and 34 consequently travel along a radius of the disk 12.

Adjacent to the inner end of the carriage and molded as an integral part thereof is a flexure element 60 projecting from the side rail 42. Secured to the flexure element 60 with a single screw fastener 62 and supported thereby in generally cantilever fashion is a gear rack 64 disposed substantially parallel to the side rail 42. The free end of the rack 64 is movable horizontally to some extent, that is, toward and away from the carriage, such movement bending the relatively stiff flexure element. The rack 64 meshes with a pinion gear 66 mounted on the drive shaft of a motor 68 secured to the undersurface of the base plate 20. It will thus be evident that rotation of the pinion in one direction or the other results in rectilinear, reciprocating motion of the carriage along the guide rods 22 and 24 toward or away from the disk axis 16.

The free end of the rack 64 is constrained to move horizontally by a rack guide 70 projecting from the outer end of the carriage. In this connection, the rack guide 70 has fingers 72 cooperating with the upper and lower faces of the rack to prevent vertical motion thereof.

The rack guide 70 encloses a compression spring 74 which bears against the free end of the rack urging the rack into firm engagement with the pinion; concomitantly, the rollers 52 and 54 are pressed against the guide rod 22 and thereby preloaded. This action of the compression spring 74 together with the unitary nature of the carriage and rack structure assures that a given angular displacement of the pinion is translated into a precisely corresponding increment of motion of the carriage and read/write heads.

Also formed as an integral part of the carriage 28 is a longitudinally-extending cantilever beam 76 having an enlarged free end 78 near the inner end of the carriage. As shown in FIGS. 1 and 3, with the guide rod 22 in place, the beam 76 is deflected, the end 78 riding on the guide rod 22 along a line of contact diametrically opposed to the line of contact of the carriage rollers 52 and 54. Any tendency of the roller 52 to lift off the rod 22 during rapid forward acceleration of the carriage is thereby resisted by the resilient beam 76 which also acts as a motion damping means by virtue of the frictional contact with the rod 22. Smooth, stable carriage motion is additionally assured by the fact that the spacing between the rollers 52 and 54 in conjunction with the limits of carriage travel are such that the line of force 80 between the rack and pinion is always positioned intermediate the axes 52a and 54a of the rollers 52 and 54.

Figure 2:
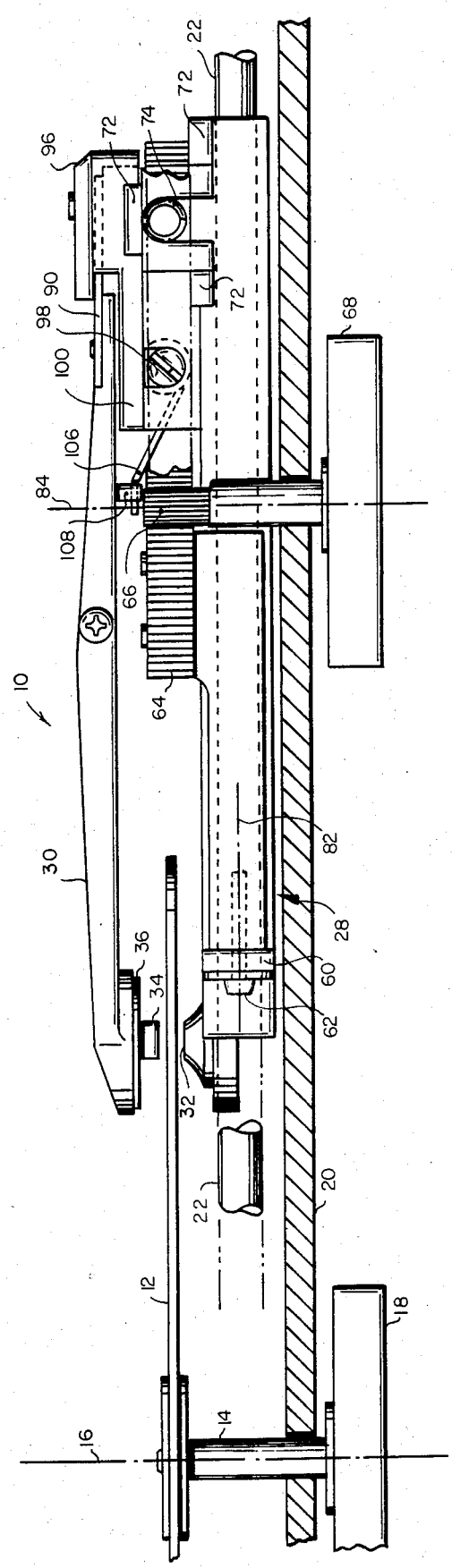
FIG. 2 is a side elevation view of the head positioning mechanism showing its relationship to a magnetic disk and the rotational axis thereof.
Figure 5:
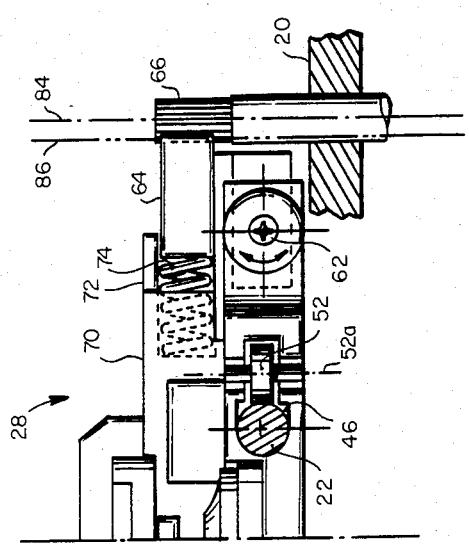
FIG. 5 is an end view of a portion of the positioning mechanism showing how the alignment of the rack and pinion is achieved.

With reference now to FIGS. 2 and 5, the mounting of the rack also facilitates precise pre-alignment of the rack and pinion elements during assembly of the positioning mechanism. In this connection, it will be seen that the axis 82 of the screw fastener 62 is perpendicular to the pinion axis 84. Specifically, momentarily loosening the screw fastener permits rotation of the rack about the axis 82 under the urging of the compression spring 74 so that alignment of the rack and pinion teeth is automatically attained. "Alignment" in this sense means that the pitch line 86 of the rack teeth assumes a parallel relationship with the vertical pinion axis 84.

The upper head arm 30 is connected at its base end to the carriage by means of a flat spring 90 which permits up and down pivoting movement of the arm 30 relative to the carriage. The flat spring 90 is clamped by a pair of screw fasteners 94 between a block 92 (formed as part of the carriage) and a cap 96. A laterally-extending shaft 98 is carried by a housing 100 adjacent to the block 92. A torsion spring 102, wound about the shaft 98, controls loading of the upper read/write head 34 by biasing the upper arm 30 toward the carriage. One end of the torsion spring is retained by a slot 104 formed in one end of the shaft 98 while the other, elongated end 106 of the torsion spring is received by an opening in a lug 108 projecting downwardly from the upper arm 30.

Figure 4:
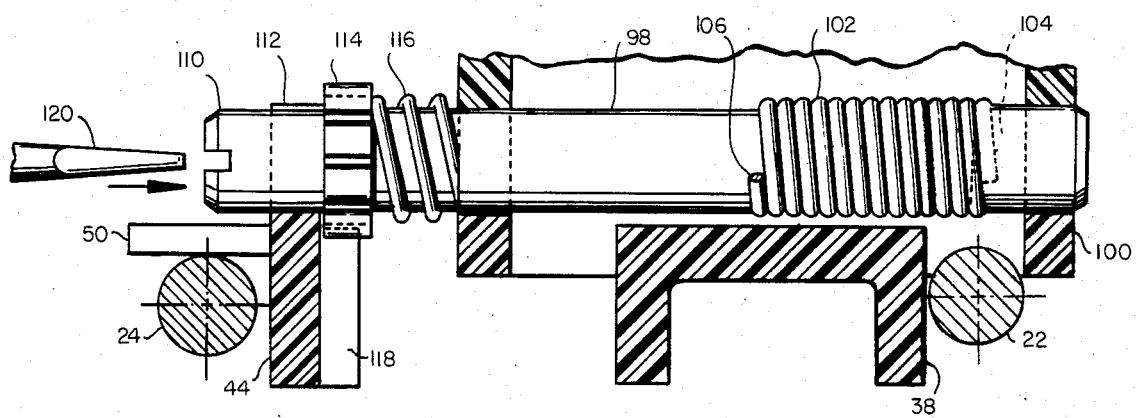
FIGS. 4 and 4A are transverse cross-sections of the positioning mechanism as seen along the plane 4—4 in FIG. 3 showing details of the device for pre-setting the loading force of the load arm.

Loading of the upper read/write head 34 may be preset by adjusting the force applied to the upper arm by the torsion spring 102. In this connection, as best shown in FIGS. 1, 3 and 4, the end 110 of the shaft 98 extends beyond the housing 100 and is journaled in a trunnion 112 on the side rail 44. An axially-slotted collar 114 on the shaft 98 is urged against the trunnion by a compression spring 116 disposed about the shaft. A key 118 projecting from the side rail 44 engages one of the slots in the outer surface of the collar. The slotted collar and key thus form a detent mechanism for locking the shaft against rotation.

Figure 4A:
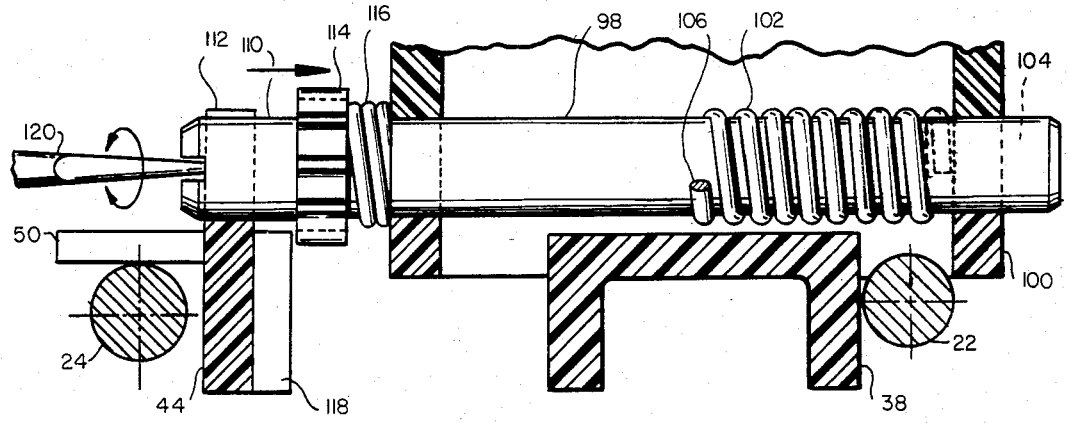

The outer extremity of the shaft end 110 is configured to receive a screwdriver 120 or the like which, when pressed against that end of the shaft, displaces the shaft axially against the bias of the spring 116 toward a detent-disengaging position (FIG. 4A) in which the collar 114 clears the key 118 permitting the shaft to be rotated to increase or decrease the preload applied by the torsion spring to the upper arm. When released, the shaft shifts back to the position shown in FIG. 4 under the force of the compression spring 116, the key entering one of the slots on the collar to once again lock the shaft against rotation.

Although a specific, preferred embodiment has been described, it will be understood that the invention is not limited thereto and that all changes and modifications thereof within the scope and spirit of the invention as defined by the claims are intended to be included.

What is claimed is:

1. A read/write head positioning mechanism in a magnetic disk memory comprising a base plate, a magnetic disk mounted on a rotatable spindle supported by the base plate, a spindle motor for rotating the disk and spindle about a central axis generally perpendicular to the plane of the disk, said mechanism comprising:
   a carriage shiftable along a guide rod toward and away from the axis of rotation of the magnetic disk, the carriage having an inner end and an outer end and supporting a read/write head adjacent the inner end of the carriage for operative association with a surface of the disk;
   a flexure projecting from one end of the carriage;
   a drive pinion;
   a motor for rotating the pinion; and
   a rack in mesh with the pinion and attached to the flexure in cantilever fashion, the rack having a free end resiliently biased away from the carriage and toward the pinion to urge the rack into firm engagement with the pinion and to urge the carriage into positive, stable engagement with the guide rod throughout the entire extent of travel of the carriage.

2. A mechanism, as defined in claim 1, in which:
   the carriage includes a pair of rollers in engagement with the guide rod, the limits of carriage travel and the spacing between rollers being such that the line of force between the rack and pinion is always disposed intermediate the axes of the rollers.

3. A mechanism, as defined in claim 1, in which:
   the free end of the rack is constrained by guide means on the carriage to movement toward and away from the carriage.

4. A mechanism, as defined in claim 1, in which:
   the rack is attached to the flexure by a single fastener having an axis perpendicular to the rotational axis of the pinion, loosening of said fastener causing alignment of the pinion and rack teeth under the urging of said spring.

5. In a magnetic disk memory including a base plate, a magnetic disk mounted on a rotatable spindle carried by the base plate and a spindle motor for rotating the disk and spindle about a central axis generally perpendicular to the plane of the disk, a read/write head positioning mechanism comprising:
   a carriage movable longitudinally along a fixed, horizontal guide rod toward and away from the axis of rotation of the magnetic disk, the carriage having an inner end and an outer end, and sides extending between said ends, the carriage supporting a read/write head for operative relationship with a surface of the magnetic disk;
   a roller mounted at each end of the carriage adjacent one side thereof, the rollers riding in contact with the fixed guide rod;
   a flexure element formed integrally with the carriage and projecting transversely from said side of the carriage adjacent the inner end thereof;
   a longitudinally oriented rack having one end secured to the flexure element, the free end of the rack extending toward the outer end of the carriage and being movable toward and away from the carriage;
   a drive pinion in meshing engagement with the rack, the pinion having a vertically oriented axis of rotation;
   a motor for rotating the pinion in response to data track address signals; and
   a compression spring carried by the carriage adjacent the outer end thereof, the spring biasing the free end of the rack away from the carriage, whereby the rack is urged into firm engagement with the pinion and the rollers are urged into positive, preloaded engagement with the guide rod.

6. A mechanism, as defined in claim 5, in which:
   the limits of carriage travel along the guide rod and spacing between rollers are such that the line of force between the rack and the pinion is always disposed intermediate the axes of the rollers.

7. A mechanism, as defined in claim 5, which includes:
   guide means projecting transversely from the outer end of the carriage and cooperating with the free end of the rack to constrain the rack to horizontal movement toward and away from the carriage.

8. A mechanism, as defined in claim 5, in which:
   the rack is secured to the flexure element by a single screw fastener whose axis is horizontal and perpendicular to the axis of rotation of the pinion, whereby the rack and pinion teeth may be prealigned under the urging of the compression spring by momentarily loosening said fastener.

9. A mechanism as defined in claim 5, in which:
   the rollers are adapted to ride on the guide rod along a line of contact; and
   the carriage includes resilient means proximate the inner end of the carriage and engaging the surface of the guide rod, the resilient means being adapted to ride on the guide rod along a line of contact diametrically opposite the roller line of contact, whereby any tendency of the roller at the inner end of the carriage to lift off the guide rod during acceleration of the carriage is resisted by the resilient means.

10. In a magnetic disk memory, a mechanism for positioning a read/write head relative to a surface of a magnetic disk, the mechanism comprising:
    means for supporting and displacing the read/write head relative to the magnetic disk surface, the head supporting and displacing means being movable along a guide means and including a flexure element;
    a gear rack mounted on the flexure element in cantilever fashion, the rack having a free end movable toward and away from the head supporting and displacing means;
    a drive pinion in mesh with the gear rack; and
    means operatively associated with the head supporting and displacing means and the free end of the gear rack for resiliently biasing (i) the gear rack away from the head supporting and displacing means and into preloaded engagement with the pinion and (ii) the head supporting and displacing means into preloaded engagement with the guide means.

11. A positioning mechanism, as defined in claim 10, in which:
    the rack is adjustably secured to the flexure element permitting prealignment of the rack and pinion gear teeth.

* * * * *